Figure 1:
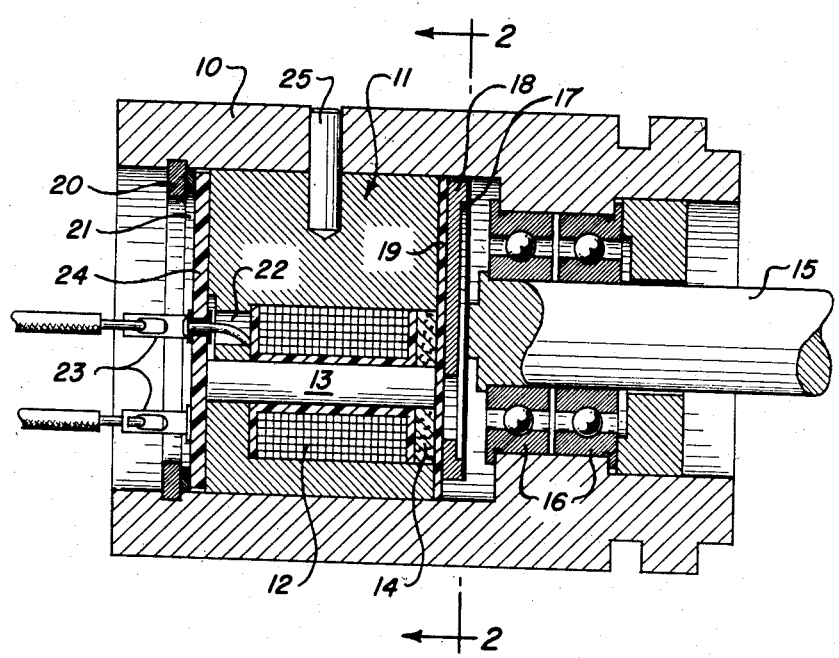

April 21, 1959

R. S. JAMIESON 2,883,633

VARIABLE-RELUCTANCE POSITION TRANSDUCER

Filed Oct. 2, 1956

INVENTOR:
Robert S. Jamieson
BY
Edward L. Amonette

AGENT

United States Patent Office 2,883,633
Patented Apr. 21, 1959

2,883,633

VARIABLE-RELUCTANCE POSITION TRANSDUCER

Robert S. Jamieson, Sandia Park, N. Mex., assignor to Ultradyne, Inc., Albuquerque, N. Mex., a corporation of New Mexico Application October 2, 1956, Serial No. 613,503

6 Claims. (Cl. 336—30)

My invention relates generally to measuring and testing, and more particularly to the measurement of the movement of a test member and the indication of its position.

My invention is particularly useful in telemetering systems wherein measurements of phenomena are transmitted as frequencies. Many transducers of the prior art, when used in such systems, generate a voltage proportional to the phenomenon, the voltage then being applied to a voltage-controlled oscillator to yield a signal whose frequency is an indication of the measurement.

It is a general object of my invention to provide for the generation of a signal whose frequency is an indication of the position of a test member.

A more specific object of my invention is to provide a position transducer which is part of an oscillator circuit and acts to vary the frequency of the oscillations in response to movement of a test member.

Other prior transducers operate on the variable transformer principle, requiring a number of electrical windings and being quite sensitive to vibrations. By reason of the principle involved these transducers are bulky.

It is therefore another object of my invention to provide a position transducer needing only one coil and being considerably smaller than those of the prior art.

Still another object of my invention is to provide a position transducer which is relatively insensitive to vibration.

In the type of telemetering system previously mentioned a certain channel of frequencies is prescribed for the transmission of data relating to a particular phenomenon, and, for ease of calibration and later interpretation of the data, it is desirable that the transducer used cause deviations in frequency that are linearly related to the changes being measured.

It is another object of my invention, therefore, to provide deviations in the frequency of an oscillatory signal which are related linearly to the movements of a test member.

Briefly, my invention accomplishes these and other objects in a novel manner, employing the use of an electrical coil and an associated magnetic circuit. A magnetic rotor, which is actuated by a test member, varies the cross sectional area of a non-magnetic gap which is part of the magnetic circuit. This gap variation causes a change in the coil impedance, resulting in a change in the frequency of an oscillatory signal, generated by an oscillator which includes the coil as a frequency-determining element.

Figure 2:
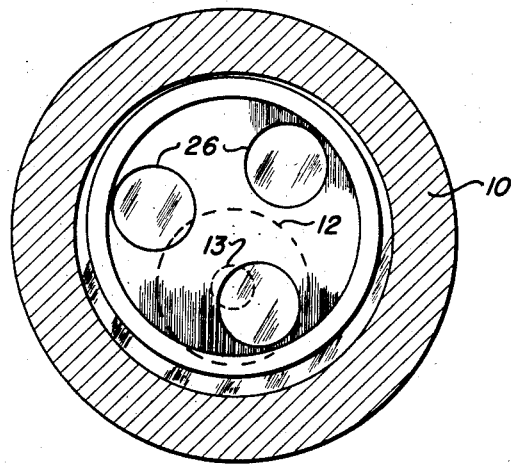

A more complete understanding of the invention may be had, and other objects will become apparent, in the reading of the detailed description to follow, in conjunction with the attached drawing in which:

Fig. 1 is a longitudinal section of the preferred embodiment of my invention; and Fig. 2 is a cross section of the same embodiment, taken at 2—2 in Fig. 1.

Referring now to the figures, the transducer is seen to be housed in an outer shell 10. Magnetic stator 11 is cylindrical and is rotatably mounted within the shell. Coil 12 is wound around pole piece 13 and mounted within the stator, held there by potting compound 14. The end of the pole piece opposite from the compound is in intimate contact with the stator, providing good magnetic conductivity. Shaft 15 is rotatably mounted within outer shell 10 by two ball bearing assemblies 16. The dual arrangement prevents shaft wobble, thereby increasing the accuracy of the instrument. Diaphragm 17 is made of spring steel and is spot-welded to the center of the shaft and to rotor 18. The welds holding the diaphragm to the rotor are made near the peripheries of those members, affording a type of universal-joint action. A tetrafluoroethylene resin wafer 19, several mils thick, provides lubrication between the facing surfaces of the rotor and the stator. Connections to the coil are taken out of the stator through holes 22 and fastened to terminals 23, mounted on terminal board 24. The stator is held within the outer shell by means of broken ring 20, the spacing between the ring and the terminal board determined by the thickness of shim 21.

It is seen that a magnetic circuit exists, including a pole piece 13, the main body of stator 11, the nonmagnetic gap between rotor and stator occupied by wafer 19, rotor 18, and the nonmagnetic gap between the pole piece and the rotor, also occupied by the wafer. An important feature of the invention is the variation of the cross sectional area of this last-named gap while the shaft rotates. Fig. 2 shows how this is accomplished: Rotor 18 is seen to have a number of holes 26 therein, although only one hole, or nonmagnetic portion, is necessary to the invention. These holes are located equidistant from the center of the rotor, within close tolerances, the distance being such that pole piece 13 lies fairly well within a projection of any one of the holes onto the stator when the rotor is in a position of slight clockwise rotation from that shown in Fig. 2. When such a position is obtained, any magnetic flux leaving the pole piece must traverse a considerable space gap in order to reach the rotor. This, then, is the position of maximum reluctance of the magnetic circuit, and hence, the position which gives the coil its minimum impedance.

Suppose, however, that shaft 15 is attached to a test member which rotates during test, causing the rotor to assume the position shown in Fig. 2. Here a boundary between magnetic and nonmagnetic portions of the rotor crosses the end of the pole piece so that there is an area of overlap of magnetic materials in which the space gap is shortened from its previous length to a length equal to the thickness of the nonmagnetic wafer. Thus, the reluctance of the magnetic circuit is decreased, increasing the impedance of the coil.

I find that, by controlling the cross sectional area of the nonmagnetic gap instead of its length, a much simpler transducer can be made. This is because the shape of the nonmagnetic portion of the rotor can be chosen to compensate for the usual nonlinear effects on coil inductance usually noticed when the size of the gap is varied. Thus, no complicated mechanical compensating systems are needed between the test member and the rotor. Further, if the position transducer relied upon variations in the length of the nonmagnetic gap, such variations would have to be limited to the order of ten mils of motion, using the usual magnetic diaphragm operating through a space gap. This would require a complicated mechanical motion-reduction system if it were desired to indicate movements of the test member in excess of ten mils. Mechanical tolerances in such a system would of necessity be very close, raising manufacturing costs considerably. It is seen that using my invention, the only motion-reduction system needed is a spoke extending radially from shaft 15, its length determining the amount of reduction.

In practice, the coil is electrically connected into an oscillator circuit by means of conductors running from terminals 23 to the remainder of the circuit. The type of oscillator circuit is not critical. I have tried the invention as part of a Colpitts oscillator and in a Hartley oscillator and have had equal success with both. In either case, the changes in coil inductance caused by shaft rotation cause modulation of the frequency of oscillations, and, by following certain calibration procedures which I will outline, I have managed to obtain a linear relationship between oscillator frequency and shaft rotation.

By close reference to Fig. 1 it will be seen that the axis of rotation of shaft 15 (and hence rotor 18) is offset from, but parallel to, that of stator 11. The amount of offset has been exaggerated in the drawing, to be observable. Actually, for a transducer having a stator of ⅝ inch diameter the offset amounts to only a few hundredths of an inch. The offset furnishes a means of adjusting the radial position of the pole piece relative to any of the holes 26, by rotation of the stator. The result of the adjustment is to change the sensitivity of the instrument, expressed as frequency excursion per degree of shaft rotation.

A further adjustment is provided in the rotor, since the three holes are equidistantly located from the center of the rotor only within certain machining tolerances. The variations in hole location within those tolerances are enough to shift the calibration curves, from one hole to another. Differences between the rotor holes caused by internal scoring during the drilling process also affect the calibration curves obtained. Therefore it is seen that, although a plurality of rotor holes are not necessary to the performance of the invention, they are a convenience in manufacturing, since greater tolerances are allowable than if only one hole were drilled.

In the calibration process, once the stator position is found which yields the desired sensitivity, a hole is drilled through outer case 10 and into the stator and the stator position is secured by means of a tight-fitting pin 25. Also, the shaft position relative to the case is indexed so that in later use the correct rotor hole will be close to the pole piece.

Another sensitivity adjustment is provided for by choice of the thickness of tetrafluoroethylene wafer 19, which controls the length of both nonmagnetic gaps in the magnetic circuit described. For instance, by changing the wafer thickness, the amount of shaft rotation necessary to cause a 12% excursion in frequency might be changed from 1° to 10°.

From the foregoing description it should be obvious that the elimination of end-play within the transducer is necessary to the successful usage thereof. If end-play due to vibration or other causes did occur during use, a nonlinear variation in nonmagnetic gap length would be probable and the results would not run true to the calibration. Several features of my invention are included specifically to hold end-play to a minimum, making possible the manufacture of a precision instrument capable of measuring shaft rotations to a 1% accuracy. Diaphragm 17 is made flat, but is deformed concavely towards shaft 15 when the diaphragm is compressed during assembly. Thus, a force is exerted on the rotor towards the stator. The amount of compression is regulated by choice of thickness of shim 21, and any end-play in shaft 15 will be taken up by flexing of the diaphragm, and not by variation in the rotor-stator spacing.

Wafer 19 also helps to insure that the nonmagnetic gaps do not vary in length. In manufacture, great care is taken to lap the facing surfaces of the stator and the rotor to a high degree of smoothness. If a perfect smoothness were obtained, and if foreign particles could be excluded from between the facing surfaces, those surfaces could bear on one another during use. However, as a practical matter I have found that microscopic particles of dust or metal are apt to remain between the surfaces in spite of extreme care in assembly; so that a nonmagnetic gap is always present, but not always constant in dimensions. These particles cause a sort of hysteresis in the calibration curves, decreasing the accuracy of the instrument. Therefore I have provided the tetrafluoroethylene wafer as a form of lubrication which will maintain constant-length nonmagnetic gaps, eliminating a form of end-play caused by foreign particles.

Although the use of wafer, or a comparable means of lubrication, is necessary where a high degree of accuracy is required, it can be eliminated in less particular applications. If it is not used, there are still the nonmagnetic space gaps in the magnetic circuit due to the shortcomings of machining methods and due to foreign particles. Adjustment of the amount of shaft rotation necessary to cause a given shift in frequency could then be provided by choice of the length of pole piece 13. This would determine the length of the space gap between the pole piece and the rotor, while the other space gap remained substantially constant.

I have found that the preferred embodiment shown in the drawing has excellent mechanical stability when exposed to large temperature changes. A transducer made of annealed magnetic material which is 64% iron and 36% nickel, and connected electrically as part of a Bendix Pacific type TOL-5 oscillator; has been found to be frequency-stable within .08% per degree F. change in temperature over a 95 degree temperature rise from room temperature. By choosing temperature compensating components for the remainder of the oscillator, the stability was increased to .01% per degree F.

Although the drawing shows circular holes in the rotor, the invention is not limited to such shapes. I found that I could obtain a linear characteristic over the required range with the easily drilled circular holes, so that is why they are shown in the preferred embodiment. Actually, my experiments have shown that an almost unlimited variety of relationships between frequency and shaft rotation may be obtained by using different shapes of holes or other nonmagnetic portions of the rotor, and by varying the cross sectional shape of the pole piece.

One skilled in the art will recognize that the drawing and preceding description describe only one preferred embodiment of my invention. Departures from the specific design shown may be made without leaving the sphere and scope of my invention which I have defined in the claims attached. For instance, the transducer is not limited to use with rotating shafts. Instead, a pivot arrangement devised by a skilled mechanic might be used in conjunction with the rotor if it were desired to measure and indicate the degree of linear movement of a test member. Also, it is advisable, when used with rotating shafts, to provide a universal coupling between shaft and transducer so that shaft wobble and end-play are reduced.

I claim as my invention:

1. A position transducer for indicating the position of a test member comprising an outer shell, a magnetic stator rotatably mounted within said shell, an inductive coil wound about a magnetic pole piece and mounted within said stator, said pole piece having one end contiguous with said stator and the other end noncontiguous with an end surface of said stator at a point removed from the axis of rotation of said stator, a magnetic rotor rotatably mounted within the outer shell about an axis offset from but parallel to the axis of rotation of said stator, said rotor having at least one nonmagnetic portion capable of approximate axial alignment with said pole piece, means for maintaining a fixed axial relationship between said rotor and said stator, means for attaching electrical conductors to said coil, and means for rotating said rotor in response to movements of the test member.

2. A position transducer as in claim 1 in which said rotor and said stator are separated by a lubricating means of fixed thickness.

3. A position transducer as in claim 2 in which the lubricating means comprises a wafer of tetrafluoroethylene resin.

4. A position transducer as in claim 3 in which said nonmagnetic portion of the rotor is of sufficient size that its projection onto the facing stator surface in the direction of the stator axis encompasses said pole piece.

5. A position transducer as in claim 4 in which said rotor has a plurality of nonmagnetic portions differing in their distances from the rotor axis.

6. A position transducer as in claim 4 in which the means for rotating said rotor comprises a shaft centered on the rotor axis, and a connecting spring diaphragm fastened on one side at its center to an end of the shaft and fastened on the other side at a plurality of places near its periphery to said rotor, said diaphragm being deformed concavely towards the shaft when assembled, whereby end play of said rotor is minimized.

References Cited in the file of this patent
UNITED STATES PATENTS

| | | |
|---|---|---|
| 2,442,751 | Abbott | June 8, 1948 |
| 2,728,893 | Bartelink | Dec. 27, 1955 |
| 2,756,357 | Schaberg | July 24, 1956 |
| 2,774,057 | Jones | Dec. 11, 1956 |